United States Patent
Manepalli et al.

(10) Patent No.: US 9,807,661 B1
(45) Date of Patent: Oct. 31, 2017

(54) CELLULAR SERVICE RECOVERY USING CELL-SPECIFIC SERVICE HISTORY

(71) Applicant: Apple Inc., Cupertino, CA (US)

(72) Inventors: Venkateswara Rao Manepalli, Sunnyvale, CA (US); Vijay Kumar Ramamurthi, Milpitas, CA (US); Srirang A. Lovlekar, Cupertino, CA (US); Lakshmi N. Kavuri, San Jose, CA (US); Thanigaivelu Elangovan, Santa Clara, CA (US); Jianxiong Shi, Dublin, CA (US); Vijay Venkataraman, Sunnyvale, CA (US); Madhusudan Chaudhary, Campbell, CA (US); Srinivasan Nimmala, San Jose, CA (US); Srinivas Burugupalli, Union City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/174,616

(22) Filed: Jun. 6, 2016

(51) Int. Cl.
*H04W 36/24* (2009.01)
*H04W 4/00* (2009.01)
*H04W 52/02* (2009.01)

(52) U.S. Cl.
CPC ......... *H04W 36/245* (2013.01); *H04W 4/008* (2013.01); *H04W 52/0258* (2013.01)

(58) Field of Classification Search
CPC ........... H04W 36/0055; H04W 36/245; H04W 36/24; H04W 4/008; H04W 52/0258
See application file for complete search history.

(56) References Cited

U.S. PATENT DOCUMENTS

| | | | |
|---|---|---|---|
| 8,744,439 | B2 | 6/2014 | Deivasigamani et al. |
| 2007/0066304 | A1 | 3/2007 | Lee |
| 2016/0006531 | A1* | 1/2016 | Kumar ................. H04J 11/0086 455/434 |
| 2016/0081095 | A1 | 3/2016 | Meredith et al. |
| 2016/0087831 | A1 | 3/2016 | Shah et al. |

\* cited by examiner

*Primary Examiner* — Marisol Figueroa
(74) *Attorney, Agent, or Firm* — Meyertons Hood Kivlin Kowert & Goetzel, P.C.; Jeffrey C. Hood

(57) ABSTRACT

This disclosure relates to cellular service recovery techniques using cell-specific cellular service history information for an accessory device. According to some embodiments, cellular service history information relating to cellular service loss occasions for each of one or more cells from which the accessory device has previously lost cellular service may be stored. It may be determined that cellular service loss is currently occurring from a cell for which cellular service history information relating to cellular service loss occasions is stored. Cellular service recovery may be attempted using the cellular service history information relating to cellular service loss occasions for the cell from which the current cellular service loss is occurring.

20 Claims, 5 Drawing Sheets

CELLULAR SERVICE RECOVERY USING CELL-SPECIFIC SERVICE HISTORY

TECHNICAL FIELD

The present application relates to wireless communication, including to techniques for a wireless device to perform cellular service recovery using cell-specific service history information.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Typically, wearable devices have relatively limited wireless communications capabilities and typically have smaller batteries than larger portable devices, such as smart phones and tablets. In general, it would be desirable to reduce the power requirements of communication devices. Therefore, improvements in the field are desired.

SUMMARY

Embodiments are presented herein of, inter alia, systems, apparatuses, and methods for a wireless device to perform cellular service recovery using cell-specific service history information.

The wireless device may be a link budget limited device, such as an accessory device with a relatively limited communication range, e.g., due to device design constraints. Because of the relatively limited communication range of the wireless device, cellular communication service coverage for the wireless device may not be as widespread as for many other wireless devices, which may in turn result in the wireless device experiencing loss of cellular service more commonly than a wireless device with greater communication range.

Recovering from loss of cellular service is commonly a heavily power consuming process, and so improvements in cellular service recovery techniques may be desirable in general. Improved cellular service recovery techniques may be of even greater use for a wireless device that may be expected to have a cellular communication service coverage area with more frequent coverage gaps than other wireless devices, since such a wireless device may experience radio link failure and out-of-service conditions more frequently.

In many instances, the characteristics of cellular service recovery after a loss of cellular service may form certain patterns specific to a wireless device, for example as a result of characteristics of the wireless device itself and/or the manner in which the wireless device is used (e.g., by a user of the wireless device). Accordingly, one possibility for improving cellular service recovery techniques at a wireless device may include using cellular service history information for the wireless device as part of cellular service recovery attempts by the wireless device. For example, the wireless device may monitor and store information relating to the cellular service history for the wireless device, e.g., including information specific to cells on which the wireless device has previously camped (e.g., previous serving cells of the wireless device), and may select certain search parameters and/or select one or more cells for targeted searching for a cellular service recovery search.

Furthermore, in the case that the wireless device has a companion device (e.g., if the wireless device is an accessory device to the companion device), cellular service history for the companion device may also be useful when attempting to recover cellular service, for example since the companion device may be subject to similar user behavior patterns if the companion device is operated by the same user as the wireless device. For example, the cellular service history for the companion device may be used in a similar manner as the cellular service history for the wireless device itself, e.g., to select certain search parameters and/or select one or more cells for targeted searching for a cellular service recovery search.

The techniques described herein may be implemented in and/or used with a number of different types of devices, including but not limited to cellular phones, tablet computers, accessory and/or wearable computing devices, portable media players, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
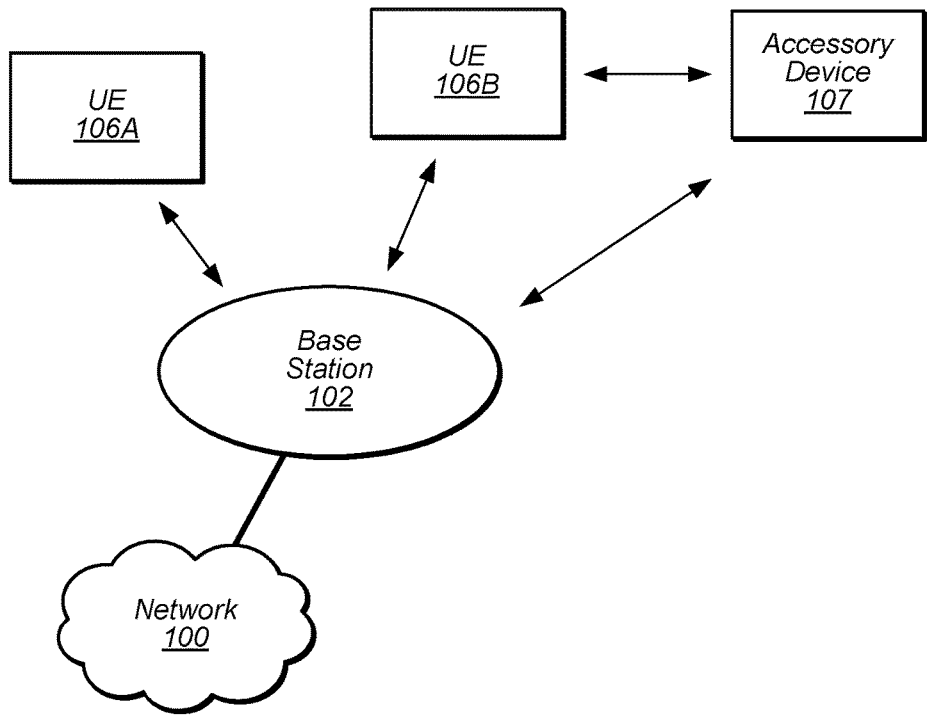
FIG. 1 illustrates an example wireless communication system including an accessory device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

The term "configured to" is used herein to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke interpretation under 35 U.S.C. §112(f) for that unit/circuit/component.

DETAILED DESCRIPTION

Terminology

The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPGAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" (also called "eNB") has the full breadth of its ordinary meaning, and at least includes a wireless communication station installed at a fixed location and used to communicate as part of a wireless cellular communication system.

Link Budget Limited—includes the full breadth of its ordinary meaning, and at least includes a characteristic of a wireless device (a UE) which exhibits limited communication capabilities, or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device. The wireless embodiment described below is one example embodiment.

As shown, the exemplary wireless communication system includes a cellular base station 102, which communicates over a transmission medium with one or more wireless devices 106A, 106B, etc., as well as accessory device 107. Wireless devices 106A, 106B, and 107 may be user devices, which may be referred to herein as "user equipment" (UE) or UE devices.

The base station 102 may be a base transceiver station (BTS) or cell site, and may include hardware that enables wireless communication with the UE devices 106A, 106B, and 107. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and 107 and/or between the UE devices 106/107 and the network 100. In other implementations, base station 102 can be configured to provide communications over one or more other wireless technologies, such as an access point supporting one or more WLAN protocols, such as 802.11a, b, g, n, ac, ad, and/or ax, or LTE in an unlicensed band (LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), HSPA, 3GPP2 CDMA2000 (e.g., 1×RTT, 1×EV-DO, HRPD, eHRPD), Wi-Fi, WiMAX etc.

Base station 102 and other similar base stations (not shown) operating according to one or more cellular communication technologies may thus be provided as a network of cells, which may provide continuous or nearly continuous overlapping service to UE devices 106A-N and 107 and similar devices over a geographic area via one or more cellular communication technologies.

Note that at least in some instances a UE device 106/107 may be capable of communicating using any of a plurality of wireless communication technologies. For example, a UE device 106/107 might be configured to communicate using one or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

The UEs 106A and 106B are typically handheld devices such as smart phones or tablets, but may be any of various types of device with cellular communications capability. The UE 106B may be configured to communicate with the UE device 107, which may be referred to as an accessory device 107, while the UE 106B associated with the accessory device 107 may be referred to as a companion device to the accessory device 107. The accessory device 107 may be any of various types of wireless devices, typically a wearable device that has a smaller form factor, and may have limited battery, output power and/or communications abilities relative to UEs 106. As one common example, the UE 106B may be a smart phone carried by a user, and the accessory device 107 may be a smart watch worn by that same user. The UE 106B and the accessory device 107 may communicate using any of various short range communication protocols, such as Bluetooth or Wi-Fi.

The accessory device 107 includes cellular communication capability and hence is able to directly communicate with cellular base station 102. However, since the accessory device 107 is possibly one or more of communication, output power and/or battery limited, the accessory device 107 may in some instances selectively utilize the UE 106B as a proxy for communication purposes with the base station 102 and hence to the network 100. In other words, the accessory device 107 may selectively use the cellular communication capabilities of its companion device (e.g., UE 106B) to conduct its cellular communications. The limitation on communication abilities of the accessory device 107 can be permanent, e.g., due to limitations in output power or the radio access technologies (RATs) supported, or temporary, e.g., due to conditions such as current battery status, inability to access a network, or poor reception.

Figure 2:
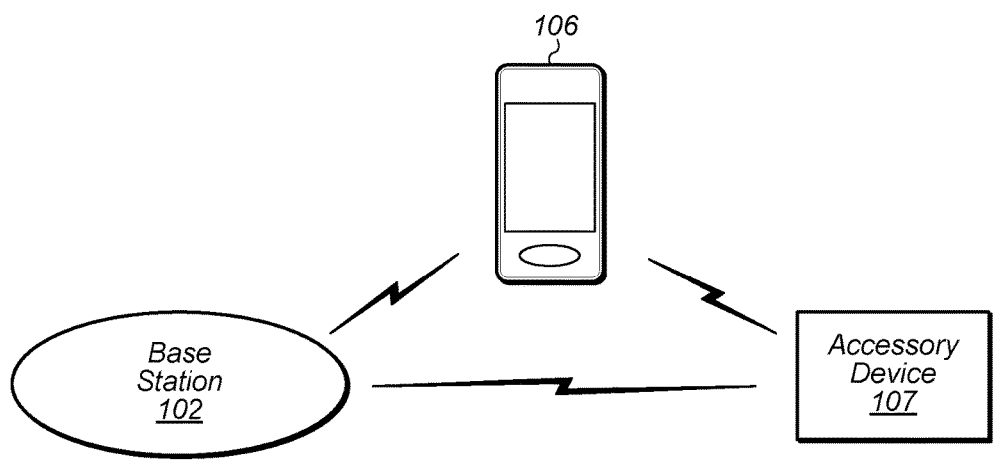
FIG. 2 illustrates an example system where an accessory device can selectively either directly communicate with a cellular base station or utilize the cellular capabilities of an intermediate or proxy device such as a smart phone, according to some embodiments.

FIG. 2 illustrates an example accessory device 107 in communication with base station 102. The accessory device 107 may be a wearable device such as a smart watch. The accessory device 107 may comprise cellular communication capability and be capable of directly communicating with the base station 102 as shown. When the accessory device 107 is configured to directly communicate with the base station, the accessory device may be said to be in "autonomous mode."

The accessory device 107 may also be capable of communicating with another device (e.g., UE 106), referred to as a proxy device, intermediate device, or companion device, using a short range communications protocol; for example, the accessory device 107 may according to some embodiments be "paired" with the UE 106. Under some circumstances, the accessory device 107 may use the cellular functionality of this proxy device for communicating cellular voice/data with the base station 102. In other words, the accessory device 107 may provide voice/data packets intended for the base station 102 over the short range link to the UE 106, and the UE 106 may use its cellular functionality to transmit (or relay) this voice/data to the base station on behalf of the accessory device 107. Similarly, the voice/data packets transmitted by the base station and intended for the accessory device 107 may be received by the cellular functionality of the UE 106 and then may be relayed over the short range link to the accessory device. As noted above, the UE 106 may be a mobile phone, a tablet, or any other type of hand-held device, a media player, a computer, a laptop or virtually any type of wireless device. When the accessory device 107 is configured to indirectly communicate with the base station using the cellular functionality of an intermediate or proxy device, the accessory device may be said to be in "relay mode."

The UE 106 and/or 107 may include a device or integrated circuit for facilitating cellular communication, referred to as a cellular modem. The cellular modem may include one or more processors (processor elements) and various hardware components as described herein. The UE 106 and/or 107 may perform any of the method embodiments described herein by executing instructions on one or more programmable processors. Alternatively, or in addition, the one or more processors may be one or more programmable hardware elements such as an FPGA (field-programmable gate array), or other circuitry, that is configured to perform any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UE 106 and/or 107 may include one or more antennas for communicating using two or more wireless communication protocols or radio access technologies. In some embodiments, the UE device 106/107 might be configured to communicate using a single shared radio. The shared radio may couple to a single antenna, or may couple to multiple antennas (e.g., for MIMO) for performing wireless communications. Alternatively, the UE device 106/107 may include two or more radios. Other configurations are also possible.

The accessory device 107 may be any of various types of devices that, in some embodiments, has a smaller form factor relative to a conventional smart phone, and may have one or more of limited communication capabilities, limited output power, or limited battery life relative to a conventional smart phone. As noted above, in some embodiments, the accessory device 107 is a smart watch or other type of wearable device. As another example, the accessory device 107 may be a tablet device, such as an iPad, with Wi-Fi capabilities (and possibly limited cellular communication capabilities), which is not currently near a Wi-Fi hotspot and hence is not currently able to communicate over Wi-Fi with the Internet. Thus, as defined above, the term "accessory device" refers to any of various types of devices that in some instances have limited or reduced communication capabilities and hence may selectively and opportunistically utilize the UE 106 as a proxy for communication purposes for one or more applications and/or RATs. As previously noted, when the UE 106 is capable of being used by the accessory device 107 as a proxy, the UE 106 may be referred to as a companion device to the accessory device 107.

Figure 3:
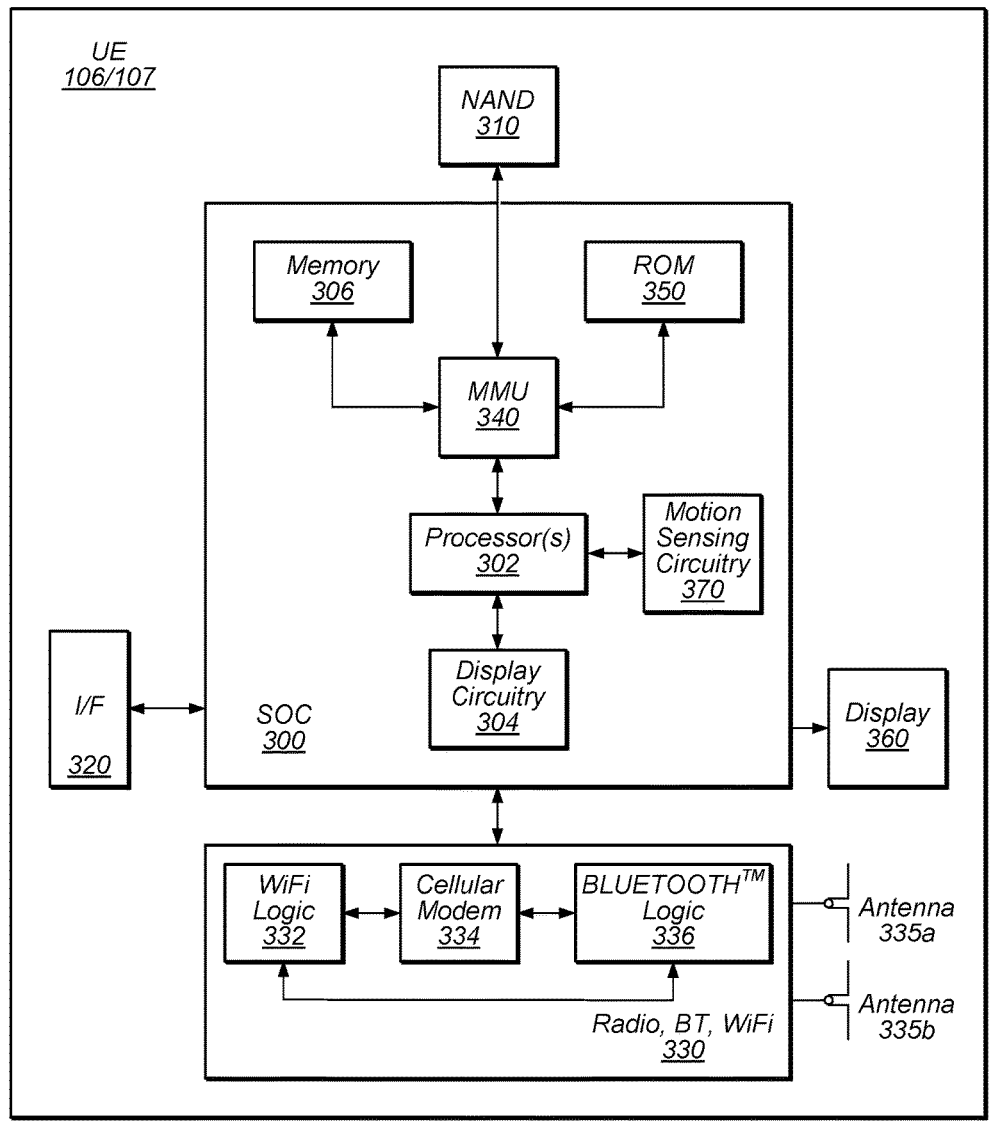
FIG. 3 is a block diagram illustrating an example wireless device, according to some embodiments.

FIG. 3—Example Block Diagram of a UE Device

FIG. 3 illustrates one possible block diagram of an UE device, such as UE device 106 or 107. As shown, the UE device 106/107 may include a system on chip (SOC) 300, which may include portions for various purposes. For example, as shown, the SOC 300 may include processor(s) 302 which may execute program instructions for the UE device 106/107, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 300 may be coupled to various other circuits of the UE 106/107. For example, the UE 106/107 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, CDMA2000, Bluetooth, Wi-Fi, NFC, GPS, etc.).

The UE device 106/107 may include at least one antenna, and in some embodiments multiple antennas 335a and 335b, for performing wireless communication with base stations and/or other devices. For example, the UE device 106/107 may use antennas 335a and 335b to perform the wireless communication. As noted above, the UE device 106/107 may in some embodiments be configured to communicate wirelessly using a plurality of wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106/107 to perform Wi-Fi communications on an 802.11 network. The Bluetooth Logic 336 is for enabling the UE device 106/107 to perform Bluetooth communications. The cellular modem 334 may be a lower power cellular modem capable of performing cellular communication according to one or more cellular communication technologies.

As described herein, UE 106/107 may include hardware and software components for implementing embodiments of this disclosure. For example, one or more components of the wireless communication circuitry 330 (e.g., Wi-Fi logic 332, cellular modem 334, BT logic 336) of the UE device 106/107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
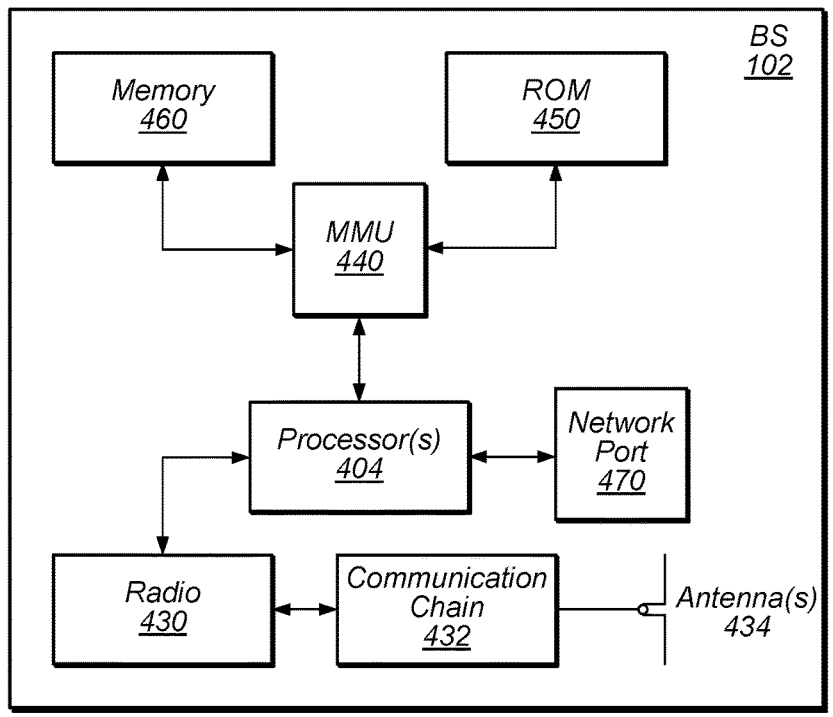
FIG. 4 is a block diagram illustrating an example base station, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106/107, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106/107. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106/107 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

FIG. 5—Flowchart

Figure 5:
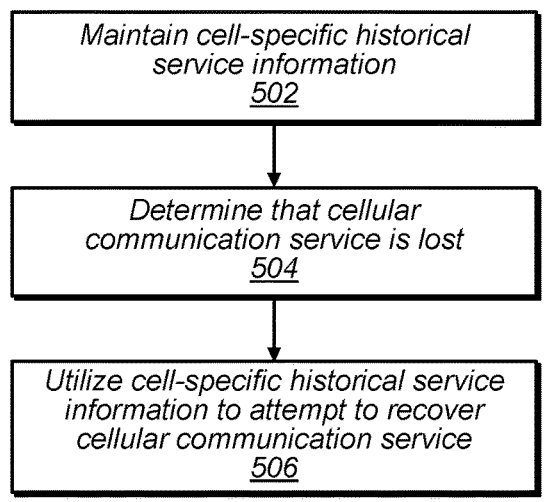
FIG. 5 is a flowchart diagram illustrating an exemplary method for a wireless device to perform cellular service recovery using cell-specific service history information, according to some embodiments.

FIG. 5 is a flowchart diagram illustrating a method for a wireless device (e.g., an accessory device) to recover from cellular service loss using cell-specific service history information, according to some embodiments. In various embodiments, some of the elements of the methods shown may be performed concurrently, in a different order than shown, may be substituted for by other method elements, or may be omitted. Additional method elements may also be performed as desired.

Aspects of the method of FIG. 5 may be implemented by a wireless device, such as a UE 106 or 107 illustrated in and described with respect to FIGS. 1-3, or more generally in conjunction with any of the computer systems or devices shown in the above Figures, among other devices, as desired. As shown, the method may operate as follows.

In 502, the wireless device may maintain (e.g., monitor and store as observed) cell-specific historical service information for the wireless device. The historical service information for the wireless device may include any of a variety of types of information, for each cell on which the wireless device has previously camped. For example, for each respective previous serving cell of the wireless device, the historical service information may include information related to the location(s) at which cellular service was lost and/or regained for some or all occasions on which cellular service was lost from the respective previous serving cell, a time or day at which cellular service was lost and/or regained for some or all occasions on which cellular service was lost from the respective previous serving cell, an amount of time (e.g., a recovery time) from losing cellular service until regaining cellular service for some or all occasions on which cellular service was lost from the respective previous serving cell, on which cell(s) cellular service was recovered for some or all occasions on which cellular service was lost from the respective previous serving cell, and/or any of various other aspects related to occasions on which cellular service was lost from the respective previous serving cell, among various possible types of historical service information.

As another possibility, the cell-specific historical service information may include neighbor information for previous serving cells of the wireless device. For example, information identifying the configured neighbors (e.g., as obtained from system information blocks, measurement configurations, etc.) for each respective previous serving cell of the wireless device may be maintained, according to some embodiments.

Note that historical service information relating to previous losses of cellular communication service may also include information indicating a type of cellular communication service loss that occurred. For example, the wireless device may maintain information indicating whether the cellular communication service loss occurred as a radio link failure from connected mode or going out-of-service from idle mode, for each previous cellular communication service loss for which location, time of day, cellular service recovery time, cell on which service was regained, etc., is recorded, as one possibility.

According to some embodiments, the wireless device may be an accessory device, such as a smart watch, with a smartphone paired as a companion device. The wireless device may pair with the companion device using one or more short range wireless communication technologies. Pairing the accessory device with the companion device may create a link between the devices such that the devices may be able to wirelessly communicate when within communication range of one another. According to some embodiments, a paired relationship between devices may optionally additionally include or enable one or more further characteristics, such as any or all of one or more shared settings, user profiles and/or accounts, data synchronization between the devices, etc.

The wireless device and the companion device may be capable of communicating with each other using any or all of Bluetooth, Wi-Fi, near field communication (NFC), and/or any of various other possible short range communication protocols, according to some embodiments. Additionally, each of the wireless device and the companion device may be capable of performing cellular communication, according to some embodiments.

Although each of the wireless device and the companion device may be capable of communicating according to multiple wireless communication technologies, at least according to some embodiments, the wireless device may have different characteristics than the companion device that may affect their respective preferred usage patterns and relationships. For example, as noted above, as one possibility the wireless device might be a smart watch (or other wearable device), while the companion device might be a smart phone, and the wireless device might have more limited battery capacity and degraded antenna performance relative to the companion device.

In accordance with such potentially differing characteristics, it may (at least some of the time) be desirable for the wireless device to utilize the cellular service communication capabilities of the companion device when available instead of performing cellular communication directly, and/or to obtain assistance from the companion device to facilitate acquisition of cellular service by the wireless device. Furthermore, it may be desirable to prepare in advance for possible scenarios when the wireless device may temporarily lose cellular service and/or the pairing connection with the companion device, such as if a user of the wireless device brings the wireless device along with them (e.g., on a run, hike, etc.) while leaving the companion device behind (e.g., at home).

Accordingly, the wireless device may receive (e.g., using a short range wireless communication technology) cell-specific historical service information from the companion device to the wireless device, and may store the received information. The cell-specific historical service information from the companion device may include similar and/or different types of information than is maintained by the wireless device.

As one possibility, the cell-specific historical service information from the companion device may relate to handover occasions experienced by the companion device (e.g., in contrast to cellular service loss occasions experienced by the wireless device), according to some embodiments. For example, for each respective previous serving cell of the companion device, the historical service information may include information related to the location(s) at which handover was performed for some or all occasions on which handover was performed from the respective previous serving cell, a time or day at which handover was performed from the respective previous serving cell, to which cell(s) handover was performed for some or all handover occasions, and/or any of various other aspects related to handover occasions from the respective previous serving cell, among various possible types of historical service information. Such handover related information from the companion device may be helpful, at least in some instances, for example if due to cellular service coverage differences between the wireless device and the companion device, handover occasions experienced by the companion device may commonly be correlated with cellular service loss occasions experienced by the wireless device.

Note that the cell-specific historical service information from the companion device may additionally or alternatively include information relating to cellular service loss occasions experienced by the companion device, e.g., including any of the types of information relating to cellular service loss occasions described previously herein with respect to the wireless device.

As another possibility, the cell-specific historical service information received from the companion device may also or alternatively include neighbor information for previous serving cells of the companion device. For example, information identifying the configured neighbors (e.g., as obtained from system information blocks, measurement configurations, etc.) for each respective previous serving cell of the companion device may be maintained, according to some embodiments.

According to some embodiments, the companion device may occasionally provide updated cell-specific historical service information to the wireless device while they are paired, e.g., in order to ensure that the wireless device has the most recent cell-specific historical service information available from the companion device. Note that if desired, such data transfers may be performed opportunistically and/or as background activities (e.g., after the wireless device and the companion device are already active and/or communicating, such as in response to user activity), which may help conserve battery power at one or both of the wireless device and the companion device. Such updates may be performed at any of various possible (e.g., approximate or precise) periodicities, such as once per week, once per day, once per hour, once per five minutes, etc. As another (alternative or additional) possibility, updated cell-specific historical service information may be provided to the wireless device in response to a triggering event, such as an initial pairing between the wireless device and the companion device, a user request, an upcoming scheduled event (e.g., a 'run', 'hike', or other activity determined to increase a likelihood of the wireless device and the companion device temporarily losing their pairing) stored in one or both of the wireless device or the companion device, etc.

In 504, the wireless device may determine that it has lost cellular communication service. For example, the signal strength of a cell to which the wireless device had been attached (e.g., a serving cell) may have decreased (e.g., due to movement of the wireless device away from the cell, increased interference, etc.) such that the wireless device is no longer able to communicate with the base station providing the cell, and the wireless device may not be aware of any suitable neighboring cells. Such a cellular communication service loss that occurs in idle mode may result in the wireless device being considered out-of-service (OOS). A loss of cellular communication service that occurs while in connected mode may trigger a radio link failure (RLF), in response to which certain RLF recovery procedures may be attempted. If successful, this may result in cellular service recovery (e.g., on the same serving cell from which cellular service was lost, or on a different serving cell), while if unsuccessful, this may result in the connection being released and OOS occurring.

In 506, the wireless device may attempt to recover/regain cellular communication service using stored cell-specific historical service information. The cell-specific historical service information used as part of the cellular communication service recovery attempt may include the cell-specific historical service information relating to the wireless device itself and/or the cell-specific historical service information relating the companion device.

The manner in which the wireless device attempts to recover cellular communication service may depend on the type of cellular communication service loss is being experienced. For example, if the wireless device was in connected mode and is experiencing RLF, the attempt to recover cellular communication service may include a RLF recovery scan/search and potential system selection procedure for a certain period of time. This search may be continuous over the period of time or may include searching for service during certain intervals within the RLF recovery search period according to a specified frequency, and may include searching for service according to a specified search scope (e.g., specifying one or more RATs, bands, and/or cells/frequencies to be searched). If the RLF recovery search is unsuccessful and the wireless device goes OOS, further searching may occur, potentially according to a different search schedule, and/or having a different search scope.

The cell-specific historical service information may be used as part of the attempt to recover cellular communication service to inform selection of some or all of the characteristics and parameters of the attempt, potentially including any or all of a search period length, a frequency at which search intervals occur during the search period, and/or a search interval length of search intervals that occur during the search period, for searching for cellular service during either or both of RLF recovery and/or OOS recovery periods. For example, as one possibility, the search period duration during RLF may be guided by one or more timers (e.g., T311, T314, and/or T315 timers, according to LTE and WCDMA), so cell-specific historical service information could be used to select a new timer value or values (e.g., new T311/T314/T315 value(s)), and a radio resource control (RRC) layer may provide the newly selected timer value to a non-access stratum (NAS) layer to implement the newly selected timer value. Alternatively, or in addition, according to some embodiments, an initial waiting period after the cellular service loss (e.g., for either or both of RLF and/or OOS) may be implemented (and its length selected) prior to initiating a cellular service search, and/or it may be determined to forego a RLF search procedure altogether and release the connection locally upon RLF being triggered, based on the cell-specific historical service information.

For example, if historical service information indicates that, for the cell from which cellular service was lost, cellular service recovery by the wireless device typically takes a certain amount of time, the wireless device might refrain from performing service scanning, or reduce the frequency or search intervals used to perform service scanning, until that amount of time (or some amount of time calculated based on the cellular service recovery time) has passed. This may take advantage of wireless device usage patterns to improve cellular service recovery attempt efficiency, at least in some instances, as the wireless device may be able to reduce power consumption during periods of time when cellular service recovery is unlikely.

According to some embodiments (e.g., additionally or alternatively), the scope for either or both of RLF and/or OOS service scans may be selected based at least in part on the historical service information. For example, according to some embodiments, an acquisition database used to select the cells searched for cellular service for either or both of RLF recovery scans and/or OOS service scans may be enhanced to include neighbor information for configured neighbors (and possibly also cellular service recovery time) for the cell from which cellular service was lost (among other cells for which such information is available), such that those configured neighbors for the cell from which cellular service was lost are included among those cells searched. As a further possibility, if desired, during the RLF recovery scan, it may be the case that only configured neighbors for the cell from which cellular service was lost are searched (e.g., at least initially). This may improve the efficiency of the RLF recovery scan, at least in some instances, as the neighbor cells may offer the greatest likelihood for the wireless device to quickly recover cellular service.

If desired, the search scope may be further targeted to prioritize one or more cells on which it is particularly likely that cellular service may be regained, based on the historical service information. For example, if cellular service loss from the current serving cell by the wireless device has previously resulted in cellular service recovery on a particular cell (or some set of cells), the wireless device may have an increased likelihood of recovering cellular service on that cell (or set of cells) again in the current cellular service recovery attempt. This may take advantage of wireless device usage patterns to improve cellular service recovery attempt efficiency, at least in some instances, as the wireless device may be able to reduce power consumption used searching for cells on which cellular service recovery is less likely.

One possibility for further refining the parameters and scope of an attempt to recover cellular service based on the cellular service history of the wireless device and/or the companion device may include considering the current location (e.g., latitude/longitude coordinates from a global navigational satellite system (GNSS) module of the wireless device) of the wireless device in conjunction with information indicating location(s) at which cellular service loss and/or cellular service recovery occurred, and/or location(s) at which handover occurred, for the wireless device and/or the companion device. For example, consider that if a user displays certain regular behavior patterns, historical cellular service information collected at or near the location at which the current cellular service loss is occurring may be more applicable than historical cellular service information collected at different locations. For example, a user commuting to work in the morning may regularly cause the wireless device to lose cellular communication service from a given cell at a particular location, only to regularly regain cellular communication service from a cell in the direction of the user's workplace. The same user might also regularly go jogging on a route that regularly causes the wireless device to lose cellular communication service from the given cell, and to regularly regain cellular communication service from a cell further along the jogging route. In such a case, the cellular service history information for the wireless device may indicate that two cells (the cell in the direction of the user's workplace and the cell in the direction of the user's jogging route) are likely candidates for cellular service recovery, but based on the location at which the current cellular service loss is occurring and the location at which the historical cellular service losses occurred, it may be possible to determine that cellular service recovery on one of those two cells is substantially more likely than the other at the current time. As another possibility, the cellular service history information for the wireless device might indicate that two substantially different typical cellular service recovery times frequently occur when losing service from the given cell (e.g., if cellular service recovery typically happens more quickly during the commute than during the jog, or vice versa), and the wireless device may be able to resolve which typical cellular service recovery time is more likely to be applicable for the current cellular communication service loss based at least inpart on the location at which the current cellular service loss is occurring and the location(s) at which the historical cellular service losses occurred.

As another possibility, consider that if a user displays certain regular daily behavior patterns on at least some days, historical cellular service information collected at a similar time of day at which the current cellular service loss is occurring may be more applicable than historical cellular service information collected at a different time of day. For example, a user commuting to work in the morning may regularly cause the wireless device to lose cellular communication service from a given cell only to regularly regain cellular communication service from a cell in the direction of the user's workplace. The same user commuting home in the evening may regularly cause the wireless device to lose cellular communication service from the given cell, and to regularly regain cellular communication service from a cell in the direction of the user's home. In such a case, the cellular service history information for the wireless device may indicate that two cells (the cell in the direction of the user's workplace and the cell in the direction of the user's home) are likely candidates for cellular service recovery, but based on the time of day at which the current cellular service loss is occurring and the time of day at which the historical cellular service losses occurred, it may be possible to determine that cellular service recovery on one of those two cells is substantially more likely than the other at the current time. Thus, as another example, the cellular service history information stored by the wireless device may include information indicating time of day at which cellular service loss and/or cellular service recovery occurred, and/or time of day at which handover occurred, for the wireless device and/or the companion device. Such information may be used, e.g., in conjunction with current time of day and other cellular service history information, to determine whether to scan, how often to scan, which cell(s) to target as likely candidates for cellular service recovery, etc. As another possibility, the cellular service history information for the wireless device might indicate that two substantially different typical cellular service recovery times frequently occur when losing service from the given cell (e.g., if cellular service recovery typically happens more quickly during the morning commute than during the evening commute, or vice versa), and the wireless device may be able to resolve which typical cellular service recovery time is more likely to be applicable for the current cellular communication service loss based at least inpart on the time of day at which the current cellular service loss is occurring and the time(s) of day at which the historical cellular service losses occurred.

Note that it may also be useful to consider the motion state of the wireless device, as it may affect the applicability of some or all of the cellular service history information. For example, if the wireless device is rapidly moving, the expected recovery time between losing cellular service and regaining cellular service may be reduced, e.g., if the wireless device is moving from the coverage area provided by the cell from which the cellular service loss occurred to a cell from which cellular service can be regained. If the wireless device is stationary or only slowly moving, the expected service recovery time may be longer. Thus, according to some embodiments, the wireless device may determine a motion state of the accessory device, e.g., using motion sensing circuitry, such as one or more accelerometers, gyroscopes, vibration sensors, and/or other motion sensing components, which may be capable of sensing motion magnitude and/or type for various types of motion, and may select the cellular service recovery attempt characteristics based at least in part on the determined motion state.

Note also that the cell-specific historical service information used when attempting to recover cellular communication service may include just historical service information specific to the cell from which cellular service was lost, according to some embodiments, or may include broader historical service information (e.g., including information relating to cells other than the cell from which cellular service was lost), as desired. Note still further that historical service information used when attempting to recover cellular communication service may be limited to historical service information relating to similar types of loss of cellular communication service (e.g., historical RLF recovery information may be used when attempting to recover from RLF, historical OOS recovery information may be used when attempting to recover from OOS, etc.), or a broader selection of historical service information may be used when attempting to recover cellular communication service, as desired.

FIGS. 6-8

Figure 6:
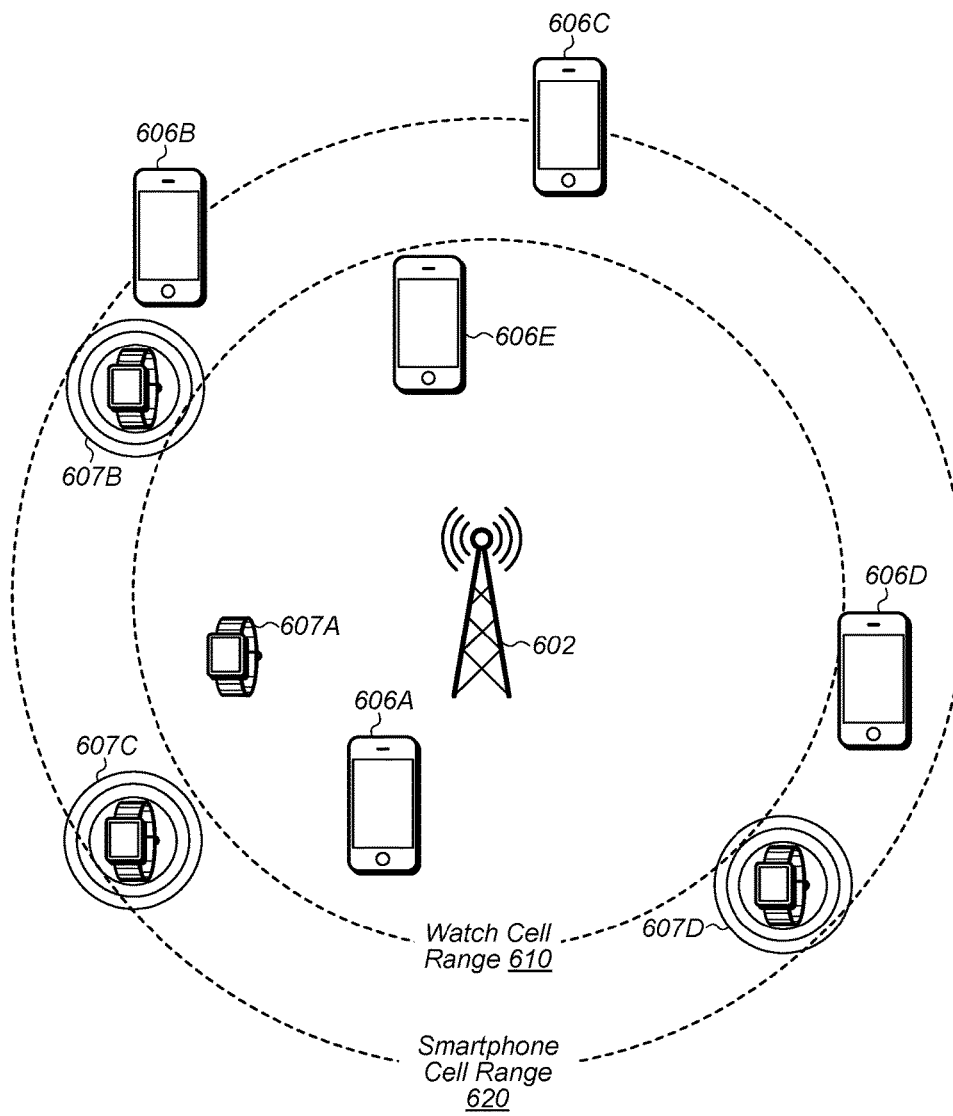
FIG. 6 illustrates a possible example coverage scenario for smartphones and smart watches, according to some embodiments.
Figure 7:
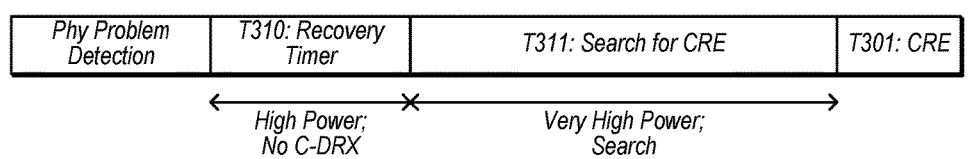
FIGS. 7-8 illustrate example possible radio link failure timelines for LTE and UMTS respectively, according to some embodiments.
Figure 8:
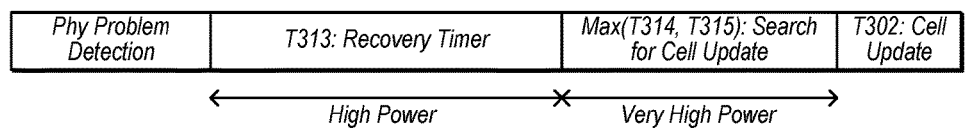

FIGS. 6-8 and the description thereof are provided by way of example, and are not intended to be limiting to the disclosure as a whole. Numerous alternatives to and variations of the details provided herein below are possible and should be considered within the scope of the present disclosure.

FIG. 6 illustrates one possible example of a coverage scenario for smartphones and smart watches, according to some embodiments. As shown, a base station 602 may provide a cell for a variety of wireless devices, including various smartphones 606 and various smart watches 607. As previously discussed, such different types of devices may have differing characteristics that result in different effective communication ranges. Thus, as shown, the effective watch cell range 610 may be smaller than the effective smartphone cell range 620. As a result, while all of the illustrated smartphones (606A, 606B, 606C, 606D, 606E) may be within communicative range of the base station 602 and thus may be able to receive cellular communication service from the cell, only one of the illustrated smart watches (607A) may be within communicative range of the base station 602, and the remainder of the illustrated smart watches (607B, 607C, 607D) may be outside of communicative range of the base station 602. Unless there are one or more other cells within range of these smart watches 607B-D, they may be unable to obtain cellular communication service and may accordingly experience cellular service loss.

FIG. 7 and FIG. 8 illustrate example possible radio link failure timelines and states for LTE and WCDMA respectively, according to some embodiments. As shown, in both LTE and WCDMA, RLF may initially be triggered when one or more physical layer (PHY) problems configured to trigger radio link failure are detected. Once RLF is triggered, a RLF recovery period may occur. In LTE, the length of the RLF recovery period may be bound by the T310 timer according to 3GPP standards documents and network operator configuration. Thus, the wireless device may attempt RLF recovery, for example by continuously monitoring the cell on which RLF occurred for recovery until cellular service is recovered or until the T310 timer expires. Note that no connected mode discontinuous reception (C-DRX) may be possible during this RLF recovery period, e.g., at least according to 3GPP TS 36.133 version 9.17.0 release 9. In WCDMA, the length of the RLF recovery period may similarly be bound, in this case by the T313 timer according to 3GPP standards documents and network operator configuration. Thus, the wireless device may attempt RLF recovery, again for example by continuously monitoring the cell on which RLF occurred for recovery until cellular service is recovered or until the T313 timer expires. In both WCDMA and LTE, this RLF recovery period may have the potential for high power consumption, e.g., as continuous monitoring the cell on which RLF occurred may consume more power than, for example, discontinuous reception operation.

If the T310 or T313 timer expires without recovery from RLF, a RLF search period may occur. As shown, in LTE, this may be bound by the T311 timer according to 3GPP standards documents and network operator configuration. Thus, the wireless device may initiate a search for cellular service (e.g., for Connection Re-establishment (CRE)), which may continue until cellular service is recovered or until the T311 timer expires. Similarly, in WCDMA, this may be bound by the greater of the T314 or T315 timer according to 3GPP standards documents and network operator configuration. Thus, the wireless device may initiate a search for cellular service (e.g., for a cell update), which may continue until cellular service is recovered or until the T314/T315 timer expires. In both WCDMA and LTE, this RLF search period may have the potential for very high power consumption, e.g., as system selection search may be a very power consumption intensive activity, especially if it is performed at a broad scope, such as if scanning all possible RATs and bands.

As shown, eventually the wireless device may recover cellular service and perform further cellular communication. Alternatively, if service is still not found at expiration of the T311 or T314/T315 timer, the wireless device may release the connection and go out-of-service, which may result in further cellular service search operations and additional time without cellular communication service.

Thus, since cellular base station deployment may at least in some instances be arranged to provide efficient cellular communication coverage for smartphones and other devices with similar cellular communication ranges, coverage scenarios such as illustrated in FIG. 6 may result in more common radio link failure and out-of-service events for smart watches and/or other devices with smaller than average cellular communication ranges (e.g., link budget limited devices). Compounding this may be the potential for attempts to regain cellular communication service when cellular communication service loss occurs, particularly when operating in connected mode and the cellular communication service loss begins as RLF, to be highly power consumption intensive. Accordingly, techniques that utilize cell-specific service history information to customize the manner in which cellular service recovery attempts are performed to increase the efficiency of those cellular service recovery attempts, such as those techniques described herein with respect to FIG. 5, may have a particularly notable beneficial effect on such link budget limited devices, at least in some instances. It should, however, be noted that such techniques may also be beneficial to non-link budget limited wireless devices (e.g., including wireless devices with larger cellular communication ranges, such as the smartphones illustrated in FIG. 6), and may also or alternatively be used in conjunction with such devices if desired.

In addition to the above-described exemplary embodiments, further embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106 or 107) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
a processing element configured to cause an accessory device to:
store cellular service history information relating to cellular service loss occasions for each of one or more cells from which the accessory device has previously lost cellular service;
determine that cellular service loss is currently occurring, wherein the current cellular service loss is occurring from a cell for which cellular service history information relating to cellular service loss occasions is stored;
receive cell-specific service history information for one or more previous serving cells of a companion device to the accessory device;
attempt to recover cellular service based at least in part on the cellular service history information relating to cellular service loss occasions for the cell from which the current cellular service loss is occurring, wherein the cell-specific service history information for the one or more previous serving cells of the companion device is used during the attempt to recover cellular service.

2. The apparatus of claim 1, wherein the received cell-specific service history information for one or more previous serving cells of a companion device to the accessory device comprises information relating to handover occasions for each of one or more cells from which a companion device to the accessory device has previously performed handover,
   wherein the current cellular service loss is occurring from a cell for which cellular service history information relating to handover occasions is received from the companion device;
   wherein the attempt to recover cellular service is further based at least in part on the information relating to handover occasions for the cell from which the current cellular service loss is occurring.

3. The apparatus of claim 1,
   wherein the cellular service history information relating to cellular service loss occasions comprises a recovery time from losing cellular service until regaining cellular service for each of one or more cellular service loss occasions.

4. The apparatus of claim 1,
   wherein the cellular service history information relating to cellular service loss occasions comprises information indicating one or more of a location at which cellular service was lost or a location at which cellular service was recovered for each of one or more cellular service loss occasions.

5. The apparatus of claim 1,
   wherein the attempt to recover cellular service utilizes the cellular service history information relating to cellular service loss occasions for the cell from which the current cellular service loss is occurring to select one or more cellular service search parameters.

6. The apparatus of claim 1, wherein the processing element is further configured to cause the accessory device to:
   store information indicating configured neighbor cells for each of one or more previous serving cells of the accessory device;
   wherein the current cellular service loss is occurring from a cell for which information indicating configured neighbor cells is stored,
   wherein the attempt to recover cellular service is further based at least in part on the information indicating configured neighbor cells for the cell from which the current cellular service loss is occurring.

7. The apparatus of claim 6,
   wherein the attempt to recover cellular service utilizes the information indicating configured neighbor cells for the cell from which the current cellular service loss is occurring to select a set of cells to search as part of a cellular service recovery search.

8. The apparatus of claim 1,
   wherein the processing element is further configured to cause the accessory device to determine a motion state of the accessory device, and
   wherein the attempt to recover cellular service is further based at least in part on the determined motion state of the accessory device.

9. An wireless device, comprising:
   an antenna;
   a radio coupled to the antenna; and
   a processing element coupled to the radio;
   wherein the wireless device is configured to:
      store information indicating cellular service recovery time on each of one or more cellular service loss occasions for each of one or more cells from which the wireless device has previously lost cellular service;
      receive cell-specific service history information for one or more previous serving cells of a companion device to the accessory device;
      determine that cellular service loss is currently occurring, wherein the current cellular service loss is occurring from a cell for which information indicating cellular service recovery time on each of one or more previous cellular service loss occasions is stored;
      attempt to recover cellular service, wherein at least one parameter used as part of the attempt to recover cellular service is selected based at least in part on the stored information indicating cellular service recovery time on each of the one or more previous cellular service loss occasions for the cell from which the current cellular service loss is occurring, wherein the cell-specific service history information for the one or more previous serving cells of the companion device is used during the attempt to recover cellular service.

10. The wireless device of claim 9, wherein the at least one parameter used as part of the attempt to recover cellular service comprises one or more of:
   an initial waiting period length after the cellular service loss prior to initiating a cellular service search;
   a cellular service search period length;
   a frequency at which search intervals occur during the search period; or
   a search interval length of search intervals that occur during the search period.

11. The wireless device of claim 9, wherein the wireless device is configured to:
   store information indicating a cell on which cellular service was recovered on each of the one or more previous cellular service loss occasions for each of the one or more cells from which the wireless device has lost cellular service,
   wherein the current cellular service loss is occurring from a cell for which information indicating a cell on which cellular service was recovered on each of one or more previous cellular service loss occasions is stored;
   wherein the attempt to recover cellular service utilizes the stored information indicating a cell on which cellular service was recovered on each of the one or more previous cellular service loss occasions for the cell from which the current cellular service loss is occurring.

12. The wireless device of claim 9, wherein the received cell-specific service history information for one or more previous serving cells of a companion device to the accessory device comprises
   indicating a cell to which handover was performed by the companion device on each of the one or more handover occasions for each of one or more cells from which the companion device has performed handover,
   wherein the current cellular service loss is occurring from a cell for which information indicating a cell to which handover was performed by the companion device on each of one or more handover occasions is stored;
   wherein the attempt to recover cellular service utilizes the information indicating a cell to which handover was performed by the companion device on each of one or more handover occasions for the cell from which the current cellular service loss is occurring.

13. The wireless device of claim 9, wherein the wireless device is configured to:

store information indicating configured neighbors for each of the one or more cells from which the wireless device has lost cellular service;

wherein the cellular service loss comprises a radio link failure from a connected mode, wherein the attempt to recover cellular service comprises a radio link failure recovery attempt period, wherein during the radio link failure recovery attempt period the wireless device is configured to search only on configured neighbors for the cell from which the current cellular service loss is occurring.

14. A memory medium comprising program instructions that, when executed, cause an accessory device to:

maintain cell-specific service history information for one or more previous serving cells of the accessory device;

receive cell-specific service history information for one or more previous serving cells of a companion device to the accessory device;

determine that the accessory device has lost cellular service on a current serving cell; and attempt to recover cellular service, wherein the cell-specific service history information for the one or more previous serving cells of the accessory device is used during the attempt to recover cellular service, wherein the cell-specific service history information for the one or more previous serving cells of the companion device is used during the attempt to recover cellular service.

15. The memory medium of claim 14, wherein the cell-specific service history information comprises at least, for each of the one or more previous serving cells, information identifying an amount of time between losing cellular service and regaining cellular service after losing cellular service on a respective previous serving cell of the one or more previous serving cells for each of one or more occasions on which the accessory device has lost service on the respective previous serving cell.

16. The memory medium of claim 14, wherein the cell-specific service history information comprises at least, for each of the one or more previous serving cells, information identifying a cell on which the accessory device regained cellular service after losing cellular service on a respective previous serving cell of the one or more previous serving cells for each of one or more occasions on which the accessory device has lost service on the respective previous serving cell.

17. The memory medium of claim 14, wherein the cell-specific service history information comprises at least, for each of the one or more previous serving cells, information identifying a latitude and longitude at which the accessory device lost service and/or latitude and longitude at which the accessory device regained cellular service after losing cellular service on a respective previous serving cell of the one or more previous serving cells for each of one or more occasions on which the accessory device has lost service on the respective previous serving cell.

18. The memory medium of claim 14, wherein one or more of a search frequency, a search interval, or a search duration used to attempt to recover cellular service are selected using the cell-specific service history information for the one or more previous serving cells of the accessory device.

19. The memory medium of claim 14, wherein the loss of cellular service comprises a radio link failure while in a connected mode.

20. The memory medium of claim 14, wherein the loss of cellular service comprises going out-of-service while in an idle mode.

* * * * *